Figure 1:
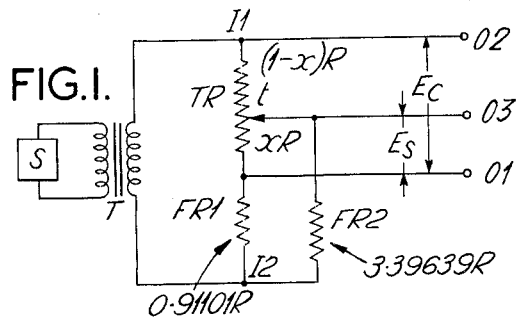

May 21, 1963  D. J. MYNALL  3,090,908
ELECTRIC CONVERSION CIRCUITS
Filed Oct. 19, 1960

INVENTOR
DENNIS JAMES MYNALL

ATTORNEY

United States Patent Office 3,090,908
Patented May 21, 1963

3,090,908
ELECTRIC CONVERSION CIRCUITS
Dennis James Mynall, Rugby, England, assignor to Associated Electrical Industries Limited, London, England, a British company
Filed Oct. 19, 1960, Ser. No. 63,536
Claims priority, application Great Britain Dec. 24, 1959
7 Claims. (Cl. 323—79)

This invention relates to an electric circuit for converting a numerical input quantity into two output quantities related to each other according to the tangent of an angle proportional to the input quantity or the input quantity plus a constant. Such a circuit is referred to hereinafter as being of the nature referred to.

There are various applications in which an electric or magnetic field is required to be controlled according to a numerical input quantity by means of two voltages or currents which are respectively sinusoidally and cosinusoidally related to the input quantity. This relationship may be required, for instance, by linear position sensing devices such as those described in our prior Patent No. 2,942,212 and application No. 816,271, and by certain rotary devices such for example as resolver synchros. In such applications, the accuracy with which the two output quantities approximate to the sine and cosine respectively of $(\theta+\epsilon)$, where $\theta$ is an angle varying in proportion to the input and $\epsilon$ is a constant which may be zero, is less important than the accuracy with which their ratio approximates to tan $(\theta+\epsilon)$. Whereas prior conversion circuits fulfilling the foregoing function have been relatively complex, the circuit of the present invention is extremely simple and can, moreover, be dimensioned to give a high degree of accuracy.

The conversion circuit of the invention comprises first and second terminals for the connection of an energizing supply for the circuit, a tapped resistance arrangement connected between said terminals in series with a first fixed resistance and having an effective tapping point that is adjustable to vary that fraction of the tapped resistance arrangement which is included between the tapping point and said fixed resistance, the tapping point being adjustable in accordance with the value of an input quantity, a first output terminal connected to a point electrically between the electrically adjacent ends of said first fixed resistance and the tapped resistance arrangement, a second output terminal connected to the other end of the tapped resistance arrangement, a third output terminal connected to said tapping point, and a second fixed resistance connected between said tapping point and the remaining end of the first fixed resistance.

To avoid doubt, it is here stated that each of the fixed resistances may, if so desired, be constituted by a variable resistor presettable to a required fixed value. Moreover the tapped resistance arrangement may be constituted by a simple tapped resistance or by an equivalent resistance network, by which is meant a network in which, by appropriate selective connection of a point in the network constituting the tapping point referred to, that fraction of the total network resistance between the first and third output terminals can be progressively varied with the input quantity, in either sense, accompanied by corresponding complementary variation of the fraction between the second and third output terminals.

With this simple circuit as set forth, it has been found that by suitably proportioning the two fixed resistances in relation to the total resistance of the tapped resistance arrangement, there can be obtained between the first output terminal on the one hand and the third and second output terminals respectively on the other hand, on application of a voltage to the energizing terminals, two outputs of which the ratio of their magnitudes varies, to a close approximation, with the tangent of an angle which goes virtually from 0 to $\pi/4$ radians as the value of the variable fraction of the tapped resistance arrangement between the first and third output terminals varies virtually from zero to unit.

For closest approximation to this tangent ratio, the optimum values for the fixed resistances to five places of decimals, taking R as the total series resistance of the tapped resistance arrangement, are 0.91101R for the first fixed resistance and 3.39369R for the second fixed resistance.

Figure 2:
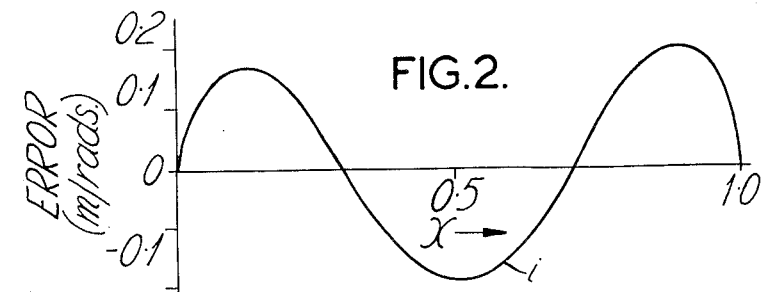
Figure 3:
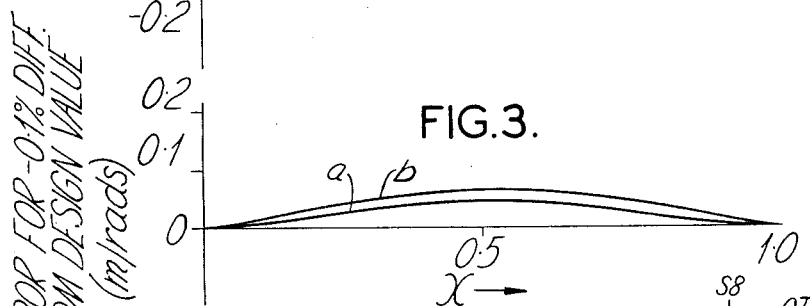
Figure 4:
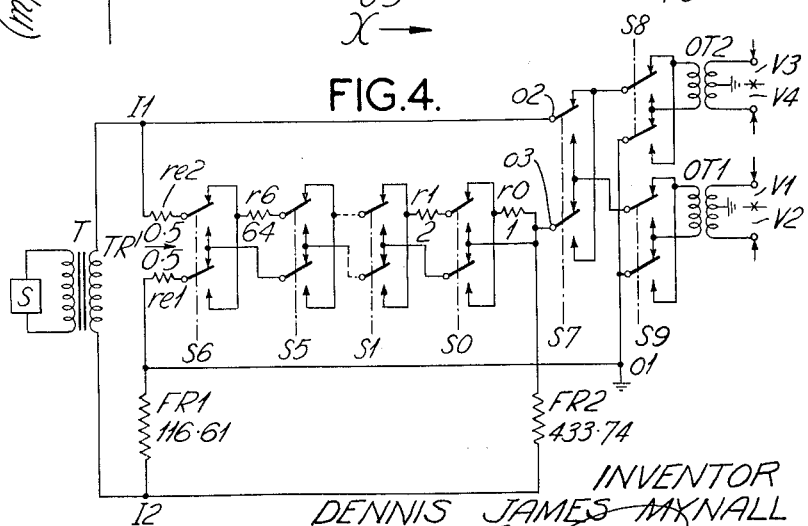

In the accompanying drawings:
FIG. 1 illustrates the basic circuit of the invention;
FIGS. 2 and 3 show error curves which will be referred to in the following description, and
FIG. 4 illustrates a more elaborate embodiment of the invention.

Referring to FIG. 1, a tapped resistance arrangement TR, represented as a simple tapped resistance is connected in series with a first fixed resistance FR1 between energizing terminals I1 and I2 fed over a transformer T from an energizing source S producing pulses or alternating voltage, normally of constant amplitude. First and second output terminals O1 and O2 are connected to the junction of TR and FR1 and to the remaining end of TR (at I1) respectively. The tap $t$ of TR is connected to a third output terminal O3 and to one end of a second fixed resistor FR2 the other end of which is connected, at I2, to the remaining end of FR1. The tap $t$ is adjustable so that, of the total resistance R of TR, the fraction $xR$ between the instant tapping point and the junction of TR and FR1 varies in proportion to an input quantity. With values 0.91101R and 3.39639R for the fixed resistances FR1 and FR2 as indicated, variation of $x$ proportionally with the input quantity produces between O1 and O3 on the one hand, and O1 and O2 on the other hand, O1 preferably being earthed, two voltages Es and Ec the magnitudes of which have a ratio Es/Ec closely approximating to the tangent of a notional angle which is proportional to $x$ and has a value of $\pi/4$ radians when $x=1$.

With the resistance ratios indicated, it can be shown that $$E_s/E_c = \frac{x}{1+(1-x)(0.26823+0.29443x)}$$

From this difference $\tan^{-1}(Es/Ec-(\pi/4)x$ can be directly calculated and plotted against $x$, and as shown by the resultant curve $i$ in FIG. 2 the difference is very small for all values of $x$. Curve $(a)$ of FIG. 3 shows the addition which must be made to the error curve of FIG. 2 if the first fixed resistance FR1 is 0.1% lower than the quoted value, and curve $(b)$ of FIG. 3 is a similar curve in respect of the second fixed resistance FR2. FIG. 3 is exemplary: corrections to FIG. 2 for other degrees of departure from the optimum values of the fixed resistances are approximately proportional in magnitude and sign.

If the two output voltages Es and Ec are required also to vary individually as sine and cosine functions of the notional angle to a commensurate degree of approximation, the source S should be designed to have a resistance value of 3.5R as seen from the energizing terminals I1 and I2.

As has already been indicated, the basic circuit of FIG. 1 covers a range of $\pi/4$ radians. If $xR$ is arranged to be adjustable in resistance steps of equal incremental amount between limits of adjustment at each of which there remains a fraction of the total resistances of TR equal to half that incremental amount (that is, $$a/2 \leqslant xR \leqslant [R-a/2]$$

where $a$ is the incremental variation of $xR$), then it becomes possible to extend the range virtually to $2\pi$ radians by including switching by which the connections of the output terminals to a utilising circuit can be interchanged and/or reversed in sign. A switching arrangement giving an extension of the range to $2\pi$ radians in this manner is included in the circuit of FIG. 4, which also includes a practical equivalent for the tapped resistance TR comprising a network of resistances which can be switched in such manner as to produce a resistance variation which is linear with respect to a numerical input quantity presented in a cyclic progressive binary form (Gray code).

One application of the invention is in conjunction with a position servo system employing a form of capacitive position sensing device conforming to our copending application No. 816,271. This device essentially comprises inner and outer coaxial cylindrical members which are axially movable relatively one to the other and which are provided on their facing cylindrical surfaces with respective sets of helical conductive paths of which those on one member are capacitively coupled to those on the other member. In general it can be said that if one of the members, constituting the input member, has $n$ interlaced helical paths ($n \leqslant 3$) which are excited by voltages of magnitudes proportional to sin $\theta$, sin $$(\theta + 2\pi/n)$$

sin $(\theta + 4\pi/n)$, ... sin $(\theta + [n-1]2\pi/n)$ respectively, an electric field will be set up which has substantially the same form for any value of $\theta$ but takes up different axial positions for different values of $\theta$ between 0 and $2\pi$ radians: the change in axial position consequent upon a change in $\theta$ is substantially proportional to that change, a change in $\theta$ of $2\pi$ resulting in a change of axial position equal to the lead of the helical system. If, then, $\theta$ is varied in accordance with a numerical input quantity the instantaneous value of which represents, within a range corresponding to the helical lead, a desired relative axial positioning of two parts (e.g. of a machine tool) to which the two members of the position sensing device are mechanically connected, an output will be obtained from the helical paths on the output member which varies in accordance with the divergence between this desired relative position and the actual relative position as sensed by the relative mechanical displacement between the two members of the device. Consequently this output can be fed to an error actuated servo mechanism which acts to bring the actual position towards the required position. It is convenient for the number of helical paths on the input member of the position sensing device to be four (i.e. $n=4$) since then the exciting voltages are required to be proportional to sin $\theta$, sin $(\theta + \pi/2)$, sin $(\theta + \pi)$ and sin $(\theta + 3\pi/2)$, that is $+$ and $-\sin \theta$ and $+$ and $-\cos \theta$. These voltages, for which the accuracy of their tangent ratio is more important than that of the individual sine and cosine functions, can be obtained from the circuit of the present invention as shown in FIG. 4, in which these voltages are denoted by V1, V2, V3 and V4 respectively.

Referring now to FIG. 4, the references employed therein have been repeated from FIG. 1 where appropriate. The terminals O1, O2 and O3 are connected, over interchanging and transposing switches which will be referred to again later, to two output transformers OT1, OT2 having, in this particular example, earthed midpoint secondary windings from which the voltages V1, V2, V3 and V4 are obtained for application to a utilizing circuit or device, not shown. Specific resistance values, in ohms, are indicated on FIG. 4 for FR1, FR2 and the component resistance I of the network TR′ constituting an equivalent of the tapped resistance TR in FIG. 1. The point at which the output terminal O3 is connected to the network TR′ corresponds to the tap $t$ of FIG. 1. The network TR′, the total resistance R of which, as constituted by the series connection of its component resistances $r$, is constant, includes switches $s$ which may be relays, for instance, and which are selectively operable to introduce between the terminals O1 and O3, in linear relationship with the numerical input quantity, a variable fraction of the total network resistance.

The most economical switching is obtained if the overall cycle of input variation catered for by the circuit is divided into a number of equal parts which is a power of two and the successive parts are numbered in the cyclic progressive binary code (Gray code). In this particular instance, assuming that the helical lead in the position sensing devices being excited is 0.1024 inch, the complete cycle of input variation (corresponding to $\theta$ varying from 0 to $2\pi$) is taken to be divided into 1024 ($=2^{10}$) unit parts, so that a unit change of the input quantity corresponds to a position change of 0.0001 inch. Thus a particular position within the 0.1024 inch position range represented by the helical lead requires 10 binary digits to define it. The switches $s$ in FIG. 3 are numbered 0–9 to correspond to these digits (0 and 9 being least significant and most significant respectively). The switches $s0$–$s6$ control the switching of the resistors $r0$–$r6$ in the network TR′, and the switches $s7$–$s9$ control the interchange and reversal of the voltages applied to the output transformers OT1 and OT2. The resistances $r0$–$r6$ increase in value by powers of 2 from the least significant end of the network and are connected between two unswitched end resistances $re1$ and $re2$ each of which has half the value of the resistance $r0$. The specific resistance values given on FIG. 3 are based on a value of R conveniently chosen to be 128 ohms.

By operation of switches $s0$–$s6$ in cyclic progressive binary code, the fractional network resistance included between O1 and O3 can be varied in unit steps each representing a unit step change of the input quantity. Calling this input quantity N (so that $0 \geqslant n \geqslant 1023$ since the input quantity is taken to be divided into 1024 unit parts), the voltage ratio $Es/Ec$ will closely correspond to the tangent of an angle of $2\pi(N+0.5)/1024$ radians, i.e. to tan $(\theta - \epsilon)$ where $\theta = 2\pi N/1024$ and is proportional to the input quantity and $\epsilon = \pi/1024$ is a constant introduced by the presence of the half-unit end resistances $re1$ and $re2$.

It may be noted here that the switches $s0$–$s6$ in FIG. 3 are shown in their positions for $N=0$, in which only the end resistance $re1$ is included between O1 and O3 and the remaining resistances of the network TR′ are included between O3 and O2. It can readily be verified, however, that as the switches $s0$–$s6$ are operated through a complete cycle, the fraction of the total resistance included between O1 and O3 is progressively increased one unit at a time while that included between O3 and O2 is correspondingly progressively reduced.

The switches $s0$–$s6$ cover a range of virtually $\pi/4$ radians of the angle $\theta$, corresponding to a range of 127 unit steps of the input quantity. Operation of switch $s7$ interchanges the voltages $Es$ and $Ec$ as applied to the output transformers OT1 and OT2 thereby providing a 128th step and also allowing an extension of $\theta$ over an additional 127 steps in the range $\pi/4$ to $\pi/2$ radians when the switches $s0$–$s6$ are taken through their sequence of operation in the reverse order to that used in the range 0 to $\pi/4$ radians. The reversal of the sequence of operation is provided automatically by the cyclic progressive cable. Operation of switch $s8$ then reverses the sign of the voltage applied to OT2 (now $Es$ since $s7$ is operated) for the range $\pi/2$ to $3\pi/4$, and the subsequent re-operation of switch $s7$ back to its original setting, with $s8$ still operated, covers the range $3\pi/4$ to $\pi$. The other half cycle, from $\pi$ to $2\pi$, is covered by operating the switches in the sequence; $s9$, $s7$, $s8$, $s7$ at the end of successive cycles of operation of the switches $s0$–$s6$, i.e. at intervals of $\pi/4$ radians. It will be observed that the presence of the half-unit end resistances $re1$ and $re2$ effectively shifts the zero of the input quantity by half a unit and that the operation of any one of the interchanging and reversing switches s7–s9 has the effect of changing the overall setting of the circuit from a condition corresponding to half a unit more, than that to which the nearest integer of π/4 corresponds.

The contact resistance of the switches s0–s6 is additive to the resistance of the half-unit end resistances, which may be correspondingly reduced in value if the contact resistance is sensible.

Thus by appropriate operation of the switches s0–s9 in cyclic progressive binary code, a numerical quantity from zero up to 1023 units can be set into the circuit and the ratio of the voltages applied to the output transformers OT1 and OT2 will closely approximate to tan $(\theta+\epsilon)$ where $\theta$ and $\epsilon$ are as given above. A circuit similar to FIG. 4 but having a rather more complex network TR' which is less economical in components may be used if the input is presented in pure binary form.

It will be understood that the invention is not restricted to 1024 steps in the complete cycle of operation, other powers of 2 being obtainable by providing more, or fewer switches, as desired.

What I claim is:

1. An electric conversion circuit of the nature referred to, comprising first and second terminals for the connection of an energizing supply for the circuit, a tapped resistance arrangement and a first fixed resistance connected in series between said terminals, said arrangement having an effective tapping point that is adjustable to vary that fraction of its resistance which is included between the tapping point and said fixed resistance, the effective tapping point being adjustable in accordance with the value of an input quantity, a first output terminal connected to a point electrically between the electrically adjacent ends of said first fixed resistance and the tapped resistance arrangement, a second output terminal connected to the other end of the tapped resistance arrangement, a third output terminal connected to said tapping point, and a second fixed resistance connected between said tapping point and the remaining end of the first fixed resistance.

2. A conversion circuit as claimed in claim 1 wherein the first and second fixed resistances have resistance values of 0.91101R and 3.39639R respectively, where R is the total series resistance of the tapped resistance arrangement.

3. A conversion circuit as claimed in claim 1 wherein said tapped resistance arrangement is constituted by a network comprising a plurality of resistances of different values together with switches selectively operable, according to the value of the input quantity, to introduce between the first and third terminals, while keeping the same total value of resistance between the first and second terminals, different combinations of said resistances presenting different combined resistance values constituting fractions of said total resistance that vary linearly with the input quantity.

4. A conversion circuit as claimed in claim 3 wherein said switches are arranged for sequential operation according to the cyclic progressive binary code and said plurality of resistances includes a sequence of resistances selectively switched by said switches and having respective resistance values increasing by powers of two.

5. A conversion circuit as claimed in claim 4 wherein said plurality of resistances also includes unswitched end resistances connected at opposite ends of said sequence of resistances between it and the first and third output terminals respectively, these end resistances each having a value substantially half that of the lowest resistance in said sequence.

6. A conversion circuit as claimed in claim 5 including in addition to the switches mentioned and operable in sequence with them, further switches effective for modifying the connections of said output terminals towards a utilizing circuit or device, for the purpose described.

7. A conversion circuit as claimed in claim 3 wherein the first and second fixed resistances have resistance values of 0.9101R and 3.39639R respectively, where R is the total series resistance of said resistances constituting said network.

References Cited in the file of this patent

UNITED STATES PATENTS

| | | |
|---|---|---|
| 2,180,659 | Bahring | Nov. 21, 1939 |
| 2,954,517 | Menzel | Sept. 27, 1960 |